United States Patent [19]

van Uitert

[11] Patent Number: 4,889,225

[45] Date of Patent: Dec. 26, 1989

[54] DEVICE FOR SUPPLYING CONTAINERS TO AN APPARATUS FOR HANDLING THEM

[76] Inventor: Johannes H. van Uitert, Vaartweg 33, 5109 RB 's-Gravenmoer, Netherlands

[21] Appl. No.: 133,803

[22] Filed: Dec. 16, 1987

[30] Foreign Application Priority Data

Dec. 17, 1986 [NL] Netherlands ............... 8603212

[51] Int. Cl.⁴ .............................................. B65G 41/12
[52] U.S. Cl. ................................. 198/444; 198/445
[58] Field of Search ............... 198/444, 445, 457, 443

[56] References Cited

U.S. PATENT DOCUMENTS 3,160,259 12/1964 Dalton ........................ 198/457 X
3,465,868 9/1969 Donner ........................... 198/444

FOREIGN PATENT DOCUMENTS 1244644 7/1967 Fed. Rep. of Germany ...... 198/445
2727277 1/1979 Fed. Rep. of Germany ...... 198/444
52316 5/1981 Japan ................................. 198/444
106713 6/1985 Japan ................................. 198/444
1093279 5/1965 United Kingdom ............... 198/445

Primary Examiner—Robert J. Spar
Assistant Examiner—James R. Bidwell
Attorney, Agent, or Firm—Dennis H. Lambert

[57] ABSTRACT

A device for supplying containers, especially bottles, to an apparatus for handling them, in particular a rinsing machine, the device comprising first and second conveyors arranged to convey the bottles into the rinsing machine, the first conveyor being directed transversely to the second conveyor. A guide positioned above the first conveyor to guide and push the bottles in juxtaposed rows onto the second conveyor for supply by the second conveyor to the rinsing machine, and at least one sensor being present to detect the presence of bottles on the conveyor and, in the absence of bottles, to increase the velocity of the first conveyor relative to the second conveyor.

6 Claims, 1 Drawing Sheet

DEVICE FOR SUPPLYING CONTAINERS TO AN APPARATUS FOR HANDLING THEM

FIELD OF THE INVENTION

The invention relates to a device for supplying containers, in particular bottles, to an apparatus for handling them, in particular a rinsing machine, said device comprising one or more endless conveyors.

PRIOR ART

When supplying containers to an apparatus for handling them, with which use is made of one or more endless conveyors, it often happens that the containers are irregularly supplied to the related apparatus. Although in certain cases this has no drawbacks, there is a decided disadvantage when supplying bottles to a rinsing machine. Most rinsing machines work in such a way that it does not make any difference whether or not a bottle is present at a given place. However when containers lacking, there is water, and cleanser.

SUMMARY OF THE INVENTION

In is an object of the invention to improve the manner of supplying bottles in such a way that one is highly assured that all available places in the rinsing machine are occupied by bottles.

According to the invention this is achieved by arranging a first conveyor transversely in respect of a second conveyor which conveys the bottles into the rinsing machine in the desired number of rows. A guide is present above the first conveyor for pushing the bottles from the first conveyor onto the second conveyor. At least one sensor is present next to the transition between the two conveyors, said sensor determining whether bottles are lacking at that place and, this being the case, increasing the velocity of the first conveyor to fill all available spaces on the second conveyor and thus in the rinsing machine. In this way, a much better supply of bottles to the rinsing machine is obtained.

When a considerable number of bottles positioned one beside the other have to be supplied to a rinsing machine, as is often the case, according to the invention it can be provided that the first conveyor comprises two or more separately driven, juxtaposed conveyor tracks, with their velocities being controlled by an equal number of sensors positioned at a mutual distance next to the transition between the first and second conveyors in such a way that, as seen in the conveying direction, the first sensor controls the velocity of the conveyor track positioned at the greatest distance from the second conveyor, and a succeeding sensor controls the velocity of the next conveyor track.

The guide positioned above the first conveyor joins the end of said second conveyor near the point of the second conveyor which lies the farthest downstream of said first conveyor, as seen in the conveying direction. From this joining point or juncture, the guide extends obliquely above said first conveyor to push all bottles gradually to said second conveyor. With this structure, the possibility exists that a sensor positioned near the end of the guide will not detect the absence of bottles, whereas a sensor which is positioned more upstream of said first conveyor will detect the absence of bottles. It is thus important to move those bottles which are at a greater distance from the second conveyor quickly in a direction towards said second conveyor whereas those bottles which are positioned nearer the second conveyor need not be moved so quickly.

Further according to the invention, it can be provided that the velocity of said first conveyor, or one of the tracks of the first conveyor, is decreased when the related sensor no longer gives a signal to increase the velocity.

When there are no bottles missing or absent from the related place, a signal will no longer be given for increasing the velocity since it is not necessary that the supply of bottles be accelerated. In this case, it might be provided that decreasing the velocity of the first conveyor or of a conveyor track of the first conveyor takes place with an adjustable time delay. By this it can be prevented that the velocity of the conveyor is changed too often.

By a proper choice of the normal velocity and of the increased velocity of said first conveyor or of the conveyor tracks comprising the first conveyor, in most cases a good supply of the bottles to the rinsing machine can be obtained, although it might be possible to increase the velocity in two or more steps. Thus, the velocity of the conveyor is continuously increased when after a given period the sensor is still giving the related signal. In a corresponding way, the velocity will be decreased step-wise when the sensor is no longer giving a signal. It is obvious that by this the device will be more complicated and so more subject to failure.

To prevent operation of the rinsing machine when not necessary and to thereby prevent loss of water, energy and cleanser, according to the invention it can be provided that a sensor be provided upstream of said first conveyor for determining whether there are bottles present which have to be supplied to the rinsing machine. This sensor, with a given time delay, functions to shut down the rinsing machine when no bottles are detected.

BRIEF DESCRIPTION OF THE DRAWING

The foregoing and other objects and advantages of the invention will become apparent from the following detailed description and appended claims when taken in conjunction with the drawings, wherein like reference characters designate like parts throughout the several views, and wherein:

DETAILED DESCRIPTION OF THE PREFERRED EMBODIMENTS

Figure 1:
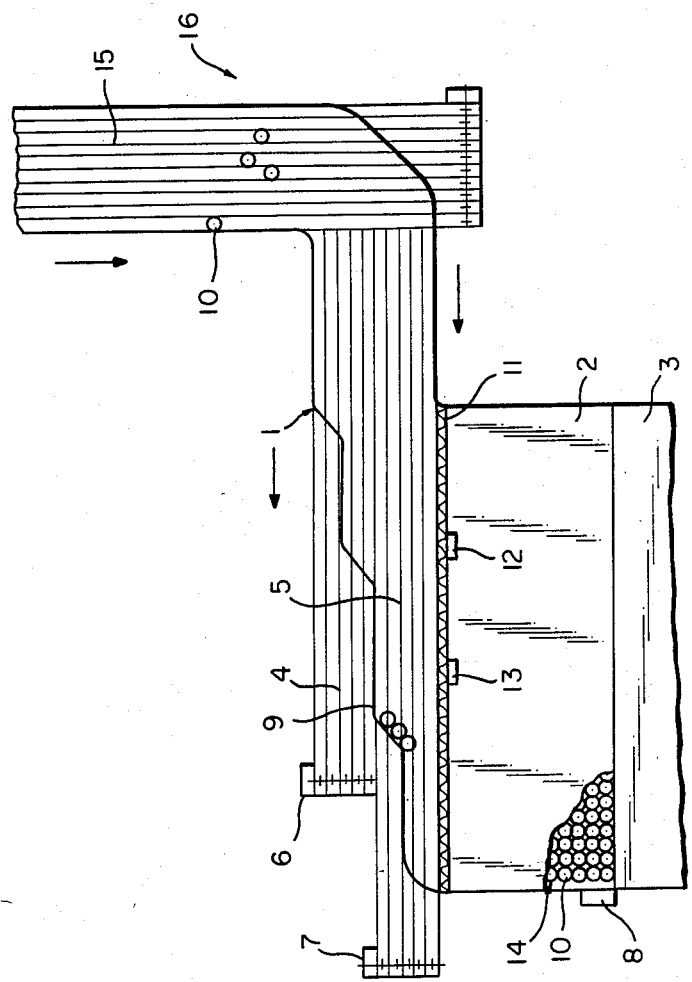
FIG. 1 is a schematic plan view of the apparatus of the invention.

Referring more particularly to the drawings, the device comprises a first conveyor 1 and a second conveyor 2, to which second conveyor the rinsing machine 3 is connected. The rinsing machine is not shown in detail, since it does not comprise a part of the present invention.

The first conveyor 1 is divided into two conveyor tracks 4 and 5, which are driven by means of the motors 6 and 7, respectively. The conveyor tracks, as such, may consist of a number of juxtaposed conveyor chains. Since this conveyor construction is conventional in many cases, it need not be described further.

The second conveyor 2 is driven by a motor 8, which rotates with a constant speed, and a guide 9 is positioned above the first conveyor 1 for pushing or guiding the bottles 10, only some of which are shown in the drawing, over the first conveyor to the beginning of the second conveyor 2.

Sensors 12 and 13 are positioned near the transition 11 between the conveyors 1 and 2, the sensor 12 controlling the velocity of the conveyor track 4 and the sensor 13 controlling the velocity of the conveyor track 5.

As previously explained, each of the sensors 12 and 13 will detect whether bottles are present in the area being scanned by the sensor. As long as bottles are present, the sensors will give no signal and the conveyor tracks 4 and 5 will move with the normal velocity set for them. When one or both of the sensors detect the absence of bottles, the appropriate conveyor track governed by that sensor will be caused to move faster by increasing the speed of the related driving motor. Accordingly, the bottles 10 will be supplied to the rinsing machine 3 in closed rows as much as possible. A number of bottles supplied in this way is indicated by 14.

In the particular embodiment shown in the drawing, the bottles are supplied to the conveyor 1 by means of a supply conveyor 15. A sensor 16 determines whether bottles are present on the conveyor 15, and in the event of absence of bottles gives a signal to shut down the rinsing machine 3. Such a signal, however, will be relayed with a given time delay so that shutting down of the machine only takes place after the sensors 12 and 13 have detected the absence of bottles.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention. Further, although the invention has been described in relation to supplying bottles to a rinsing machine, other objects could be supplied to other handling machines using the principles of the invention.

I claim:

1. A device for supplying containers, especially bottles, to an apparatus for handling them, in particular a rinsing machine, said device comprising:

first and second conveyors adapted and arranged to convey the containers to the apparatus in a desired number of rows, said first conveyor being directed transversely to the second conveyor and comprising at least two juxtaposed, separately driven conveyor tracks;

a guide means present above the first conveyor for guiding and pushing the containers from the first conveyor onto the second conveyor; and a plurality of sensors positioned at a mutual distance next to the transition between the first and second conveyors for detecting whether containers are lacking at that place and, in such event, operable to increase the velocity of the first conveyor relative to the second conveyor, said sensors connected to control means for the first and second conveyors in such a way that, as seen in the conveying direction, the first sensor controls the velocity of the conveyor track positioned at the greatest distance from the second conveyor, and a succeeding sensor controls the velocity of the next conveyor track.

2. A device as claimed in claim 1, wherein:
the velocity of at least one track of the first conveyor is decreased when the related sensor is no longer giving a signal to increase the velocity.

3. A device as claimed in claim 2, wherein:
an adjustable time delay is connected to decrease the velocity of at least one track of the first conveyor.

4. A device as claimed in claim 1, wherein:
a sensor is provided upstream of the first conveyor, said sensor being operable to detect whether at that place there are still bottles which have to be supplied to the apparatus, said sensor being operable, with a given time delay, to shut down the apparatus when no further bottles are detected upstream of the first conveyor.

5. A device as claimed in claim 4, wherein:
the apparatus comprises a rinsing machine.

6. A device as claimed in claim 1, wherein:
the apparatus comprises a rinsing machine.

* * * * *